United States Patent [19]

Li

[11] Patent Number: 6,049,829
[45] Date of Patent: Apr. 11, 2000

[54] INFORMATION ACCESS SYSTEM AND METHOD

[75] Inventor: Chia-Chang Li, Holmdel, N.J.

[73] Assignee: AT&T Corp., New York, N.Y.

[21] Appl. No.: 08/898,238

[22] Filed: Jul. 22, 1997

[51] Int. Cl.[7] .............................. G06F 13/38; G06F 15/17
[52] U.S. Cl. ........................ 709/229; 709/225; 709/217; 709/214
[58] Field of Search ........................ 707/200, 5; 370/331; 395/200; 709/214, 217–218, 225, 226, 229

[56] References Cited

U.S. PATENT DOCUMENTS

| | | | |
|---|---|---|---|
| 5,781,909 | 7/1998 | Logan et al. | 707/200 |
| 5,787,077 | 7/1998 | Kuehnel et al. | 370/331 |
| 5,832,223 | 11/1998 | Hara et al. | 395/200 |
| 5,855,015 | 12/1998 | Shoham | 707/5 |

FOREIGN PATENT DOCUMENTS

WO97/07656  3/1997  WIPO .

OTHER PUBLICATIONS

Shared Castout Buffer, IBM Technical Disclosure Bulletin, vol. 28, No. 3, Aug. 1985.
Webcaching Via Satellite: Internet Highway or Copyright Infringement?, Co9mmunication and Law, Henry Wong, Dec. 1, 1998.
"Teleweb: Loosely connected access to the World Wide Web" by B. N. Schilit et al., *Computer Networks and ISDN Systems*, vol. 28, No. 11, May 1996; p. 1431–1444, XP004018240, cited as particularly relevant if taken alone as to claims 1, 2, 13, and 14; p. 1432, left–hand col., line 4—p. 1433, left–hand col., cited as particularly relevant if combined with another document of the same category as to claims 8, 9; p. 1434, left–hand col., line 26 –line 42 cited as technological background as to claims 3–7, 10–12, 15–24; p. 1438, left–hand col., line17–line 25, p. 1440, right–hand col., line 11–p. 1441, left–hand col., line 10 cited as technological background, all in the European Search Report dated Nov. 13, 1998, for European Application EP 998 30 5682.
"World–Wide Web proxies", A. Luotonen et al., *Computer Networks and ISDN Systems*, vol. 27, No. 2, Nov. 1994, p. 147–154 XP004037985, p. 152, Left–hand col., line 1—p. 153, left–hand col., line 16, figures 5, 6, cited as particularly relevant if combined with another document of the same category as to claims 8,9 in the European Search Report dated Nov. 13, 1998, for European Application EP 98 30 5682.
European Search Report dated Nov. 13, 1998, for European Application EP 98 30 5682.

*Primary Examiner*—Frank J. Asta
*Assistant Examiner*—Mahmanzar Moezzi
*Attorney, Agent, or Firm*—Oliff & Berridge, PLC

[57] ABSTRACT

An information access system and method is presented which allows a network-connected user to view information content on the network according to the electronic proximity to the user, and other factors. Information content is discriminated according to the type of that information, and physical channels available to access that information. The illustrated information types can include infoid, local content and remote content.

24 Claims, 4 Drawing Sheets

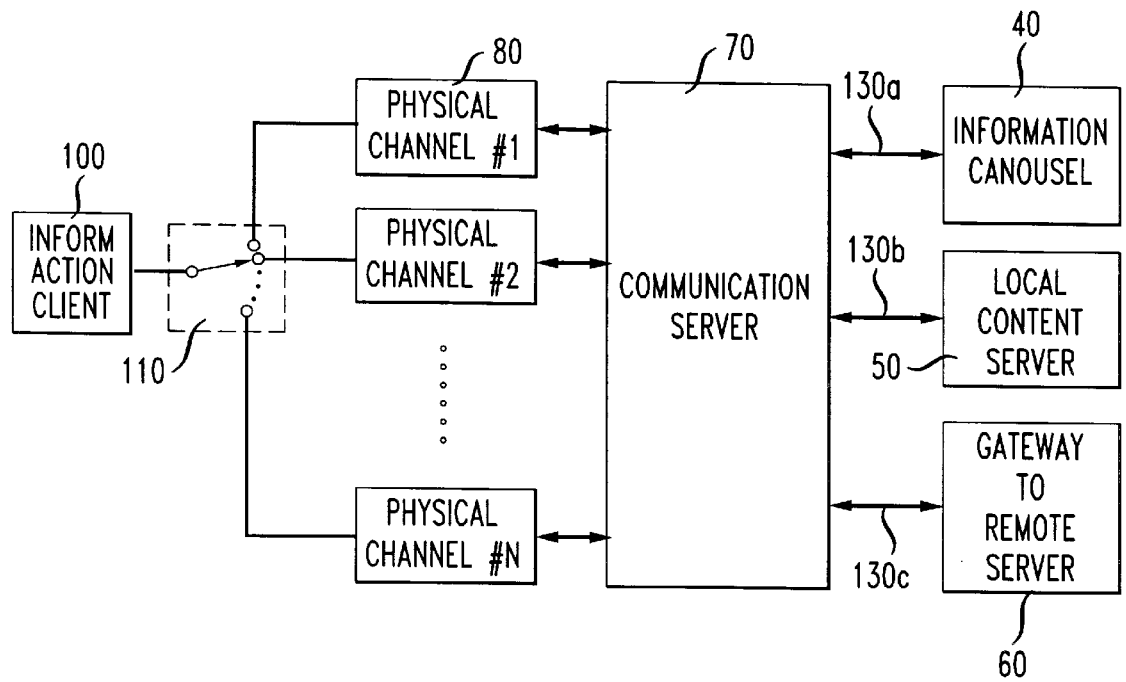

INFORMATION ACCESS SYSTEM AND METHOD

BACKGROUND OF THE INVENTION

1. Field of Invention

The invention relates to information access technology, and particularly to user selection of network access modes according to location of information content, network and server capacity, and other factors.

2. Description of Related Art

Today's web browsing technology treats the Internet as a flat information structure. That is, to users all web sites appear to be on the same information "plane". Following a link from one site to another is like moving from one point to another equally distant point on that plane. Users have no a priori indication of the speed and ease of reaching information sources at the next site. Users also usually have no way to decide beforehand whether to access a particular web site based on its grade or nature of service, and so performance expectations are unsure.

While there are directory structures organizing the content of web servers, the structures do not indicate the "Electronic Proximity" of that information content to users. The term "Electronic Proximity" (EP) as used in this application refers to a user's sense of proximity, speed and ease of acquiring information over a network. Factors contributing to Electronic Proximity include the server capacity of an information source, the bandwidth of the backbone network, the bandwidth of the access network, the loads of the servers and networks, and the placement and access mechanisms of the servers.

Except in offices with LANs, the dominant connection mediating EP today is the multi-Kbps access pipes provided by V.series modems using POTS (Plain Old Telephone Services). With emerging high-speed access mechanisms, for example, cable modems, IDSN, and ADSL modems, this dominant access mode is increasingly being supplanted. The information hierarchy and differing pipe widths inside the World Wide Web consequently are increasingly being exposed, since users see more access bandwidth. As demand for access increases, in addition to adding server and backbone capacity to take advantage of new high-speed access pipes, it is now also possible to exploit new techniques of server placement and access mechanisms, to improve overall user experience on the World Wide Web.

SUMMARY OF THE INVENTION

The invention accordingly relates to an information access system and method to organize a network and server system reflecting the logical structure of information sources, and entry points to those sources. The invention allows users to take advantage of knowledge of the information structure to obtain better services more conveniently and consistently, and allow service providers to offer a richer set of services in a more cost-effective way.

In the invention, information is categorized, stored and distributed according to the "closeness" to the client in an EP sense, and the nature of the information. The information is broken into a hierarchy of types, illustratively at least three classes. The type of information that is closest in an EP sense to users are information elements, referred to as "infoids" herein, on a specially-provided Information Carousel. Those infoids are constantly broadcast through one or more physical channels to all the information clients on a shared network system. The Information Carousel automatically distributes infoids of an infoid package in rotation to be picked up by any information client on the system without explicit client request, as long as that client has the proper decoding information for the physical channel over which that Information Carrousel stream is carried. There may be more than one Information Carrousel on an access network. In addition to infoids that are grouped together in packages, an Information Carrousel can also carry information from a next-category Local Content Server if it meets certain access criteria, for example, client access frequency rising above a threshold. The infoids can also be moved from an Information Carrousel to a Local Content Server when they meet some conditions, for example, timer expiration.

Local Content (LC) is the type of information second closest to clients in the invention. LC is stored on local server(s), and unlike infoids can be accessed upon client request. In addition to content that is designated as local and stored in an LC server until further notice, a LC server can also carry information content from a Remote Content Server if it meets certain access criteria, for example, client access frequency. Local Content can also be removed from an LC server when it meets some conditions, for example, that the content has become stale as indicated by timer expiration, or when access frequency by clients decreases below a threshold.

Lastly, in the third illustrative category Remote Content (RC) refers to all other information that is stored remotely on the World Wide Web, and can be accessed through the regular manner of Web browsing. If a piece of information is accessed frequently enough or has just been accessed, it can also be copied and moved to an LC server closer to the client, a process that is commonly referred to as "caching".

BRIEF DESCRIPTION OF THE DRAWINGS

FIG. 3 illustrates a system configuration of access node including the relationship between communication server, information sources, and physical channels according to the invention;

FIG. 4 illustrates a channel map for information access according to the invention.

DETAILED DESCRIPTION OF PREFERRED EMBODIMENTS

Figure 1:
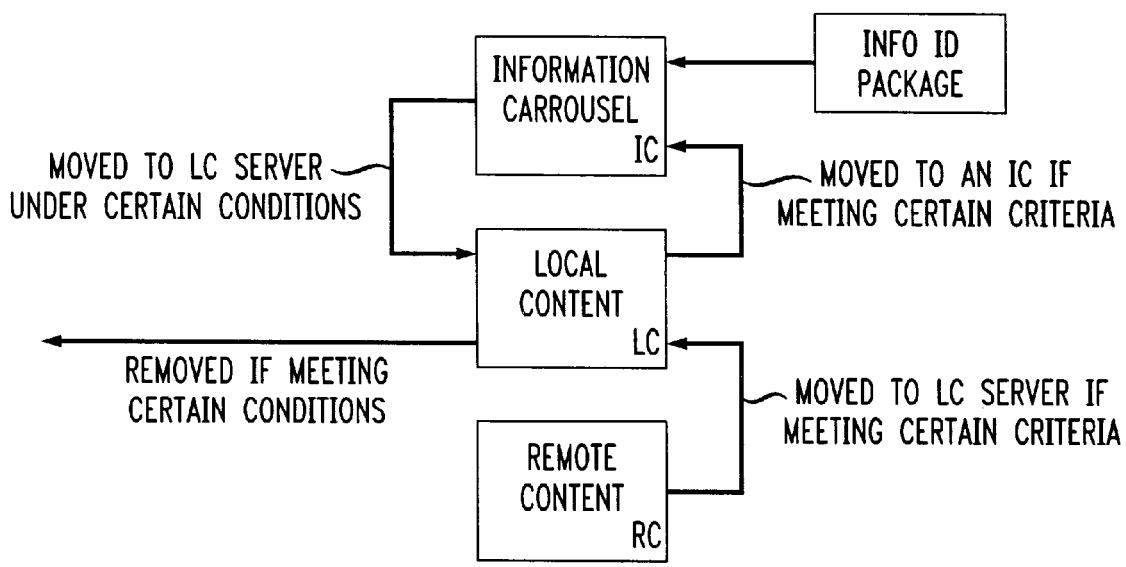
FIG. 1 illustrates an information hierarchy in an information access system according to the invention.

FIG. 1 shows the hierarchical arrangement of information used in the system and method of the invention. In the invention, the structuring and placement of information in Information Carrousels and Local Server 50 is under the control of network access node 30.

The most distant sources in an EP sense are Remote Servers 20. The placement and control of Remote Servers 20 is autonomous, like today's World Wide Web, into which the invention can connect for information supply from that category. However, the presentation of information of all three types of information content, Infoid, Local Content, and Remote Content to the client is under the network access system's overall control.

Figure 2:
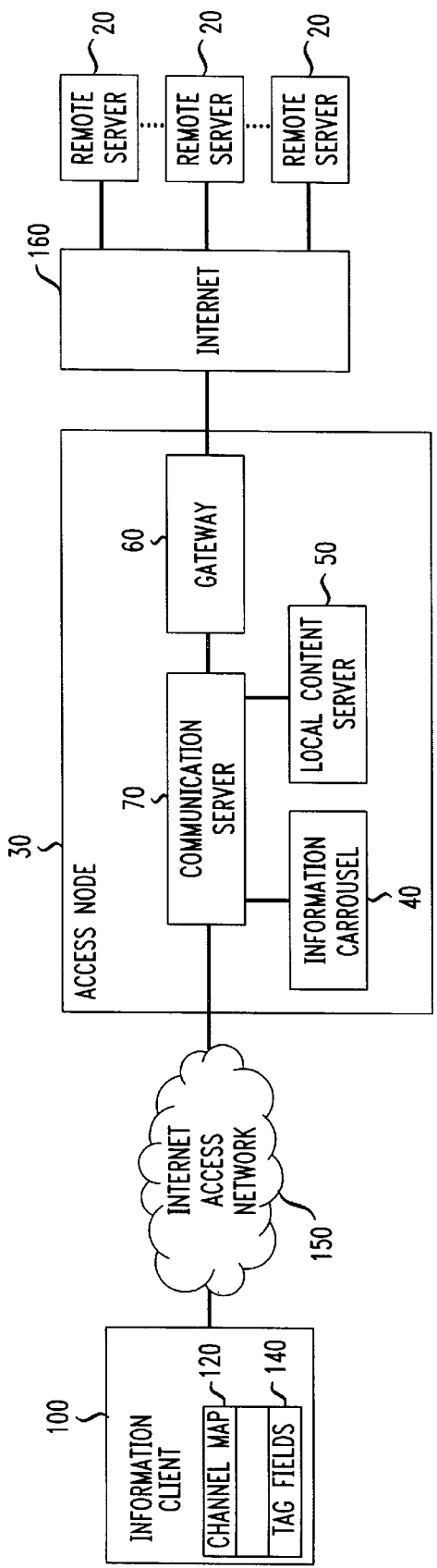
FIG. 2 illustrates an overall architecture for an information access system according to a first illustrative embodiment of the invention.

FIG. 2 illustrates a physical architecture of the network access node 30 according to a first illustrative embodiment of the invention. Content in Remote Servers 20 is accessed through the Internet 160 in any conventional manner, as understood by persons skilled in the art. This category however offers little direct guarantee of access performance to that information. Access node 30 itself contains Information Carrousel Server 40, Local Server 50, and a gateway 60 for connectivity with Remote Servers including the rest of the Internet. Access node 30 also contains a Communication Server 70 for multiplexing, scheduling, and inserting information content from Remote Servers, Local Servers, and Information Carrousel Servers 40 for delivery to information clients 100.

The Communication Server 70 is responsible for the allocation of access network bandwidth among different information sources, and communicating that allocation to the information clients 100. An information client 100 can for example be a PC running Windows™, a workstation running UNIX™, a network computer running Netware™, or any other information consumption device. Information client 100 can service users accessing the network access node 30 through dial-up Internet Services Providers (ISPs) 150, or other suitable access modes. Communication Server 70 carries out multiplexing, scheduling and control so that content residing in access node 30 can be accessed with a certain guarantee of grades of service. Remote Servers 20, Local Server 50, and Information Carrousel Server 40 cooperate in information access node 30 to offer an information client 100 a unified interface to access content at different levels of the information hierarchy, with discriminated levels of grades of service.

FIG. 3 illustrates the functions of Communication Server 70 embedded in access node 30. Communication Server 70 is connected to a single broadband access medium that can be further partitioned into multiple physical channels 80. Those channels can for instance be multiple RF channels over coaxial cable, or radio links or multiple physical channels (1 through N) of different transmission media. The physical channelization of a broadband medium can be done by frequency division multiplex (FDM), time division multiplex (TDM), statistical multiplex (SM), combinations of the above or otherwise, as understood by persons skilled in the art. A variety of performance attributes are associated with physical channels 80, including latency, capacity (for example, bps or MHz ratings) and connectivity types (point-to-point, broadcast, etc.) that can be translated into grades of service and service types. Different ones of physical channels 80 can also be used to provide connectivity to different information clients 100, or groups of information clients.

Communication Server 70 receives information content from each of Information Carrousel Servers 40, Local Content Servers 50, and Remote Servers 20 through associated communication links 130*a*, 130*b*, and 130*c* (last through gateway 60). According to the types of information content and the attributes of the physical channels 80, the Communication Server 70 delivers the information content across physical channels 80 to the intended information client 100, at the desired grades of service and service types requested by the client. To do so, the information client 100 is configured to communicate specialized control data with its associated Communication Server 70.

The first illustrated embodiment of the invention includes an access mechanism for information client 100 which expands on the existing HTML (Hyper Text Markup Language, known in the art) standard, by adding the definition of additional "tag" fields 140 to otherwise conventional control data. The tag fields 140 are used to establish a link 110 to the physical channel 80 that carries the information pointed to by the link 110.

To coordinate the setup of link 110, physical channel 80 and related pathways to information client 100, the client 100 establishes a channel map 120 for the association of virtual channels, physical channels, and content type in the virtual channels. FIG. 4 shows an example of such a channel map 120 for the illustrative broadband medium of coaxial cable. In that map, Virtual Channel ID is the identifier of a virtual channel, and may be used as one value of the tag data in expanded HTML. RF Channel Number identifies a 6 MHz-wide analog bandwidth allocation that a digital bit stream is modulated on. Stream ID identifies a given partition of a digital bit stream, and is usually used as part of the header of packets. In this illustrative embodiment, a physical channel 80 is effectively identified by a combination of RF Channel Number (FDM) and Stream ID (SM). Channel map 120 shows that there are multiple VCs for infoids, one VC for Local Content and one VC for Remote Content. This configuration however is merely illustrative. Other possible arrangements include, for example, the cases of one VC for both Local Content and Remote Content, or multiple VCs for Local Content or Remote Content, and many others. In all instances, the multiplexing, scheduling and other control of the characteristics of the VCs maintained for client 100 are controlled by Communication Server 70.

In the first illustrative embodiment of the invention, an Access Type tag is included with every URL (Universal Resource Locator) to identify the hierarchical type of information (IC, RC, or LC) and the Virtual Channel ID (VCID) for that link 110. The client's browser then uses the VCID and the channel map 120 to find the necessary physical channel, and instruct the associated device driver on the information client 100 to tune to the proper physical channel 80, for reception of the content pointed to by the URL. For example, the appropriate frequency for a particular 6-MHZ coaxial band may be coordinated with VCID and other information in channel map 120 to establish the pathway from the information source to client 100. If no Access Type is given, a backward compatibility default is preferably defined. A logical choice for the default is Remote Content (RC). In an alternative implementation without the channel map 120, physical channel information can be stored as tags directly in URL links.

The first illustrative embodiment described above allows the client 100 to browse the content in Information Carrousels and other sources in a completely passive manner, which is useful in broadcast media such as one-way cable systems or Direct Broadcast Satellite (DBS).

Figure 5:
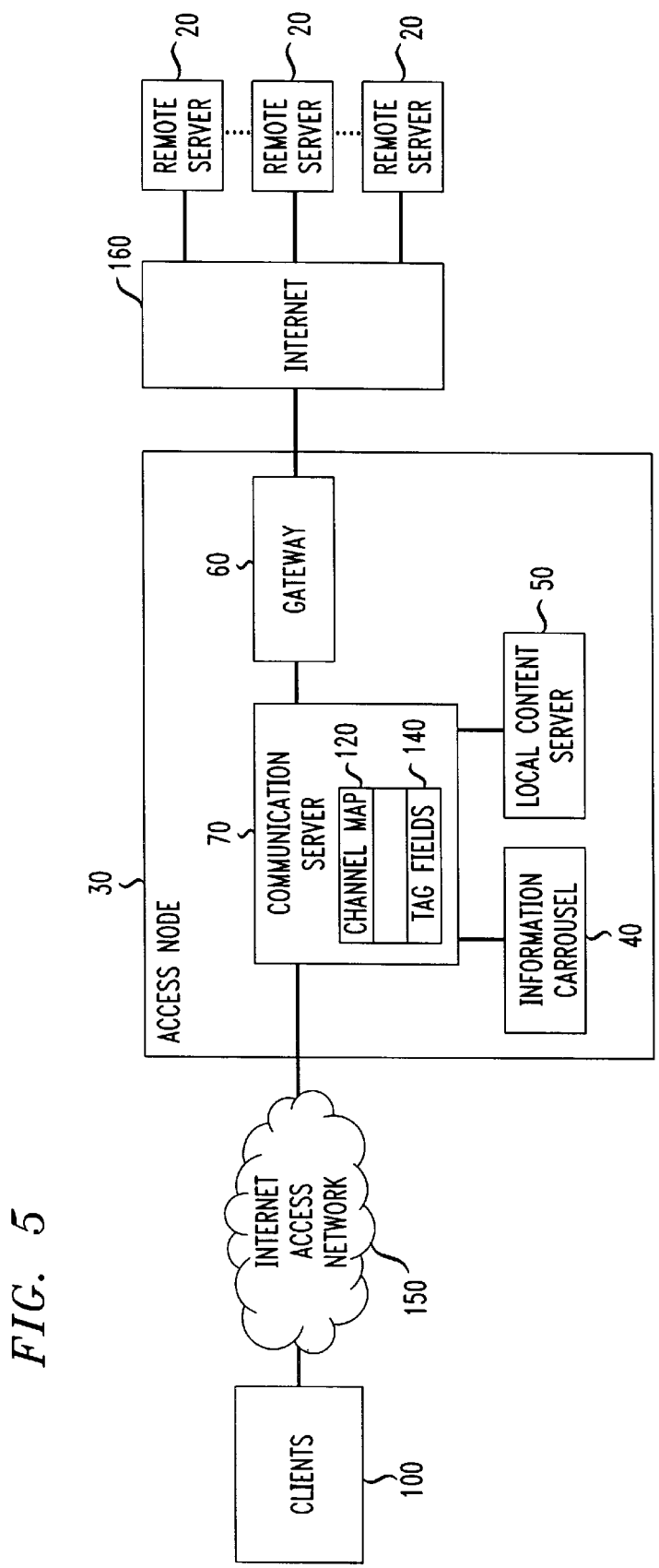
FIG. 5 illustrates an overall architecture for an information access system according to a second illustrative embodiment of the invention.

However, if interaction between servers and clients 100 is possible and desired, such as the case of two-way cable systems, the burden of maintaining the channel map 120 can be removed from the client 100. In this second illustrative embodiment, illustrated in FIG. 5, HTTP (Hyper Text Transfer Protocol, known in the art) can be expanded to include the capability for the servers themselves to respond to requests for information on the physical channel 80.

In this embodiment Communication Server 70, rather than the client 100, maintains the channel map 120 and responds to requests from one or more clients 100 in real time. Client 100 can therefore be implemented to more modest specifications for processor, software storage and other features (be made a "thin" or thinner client). Virtual channel, physical channel and other information is stored and processed by Communication Server 70 similarly to the client 100 in the first illustrative embodiment. In exchange for the extra load of responding to requests concerning physical channels 80 and other information, in this embodiment Communication Server 70 gains the flexibility of controlling dynamic bandwidth allocation. The information client 100 is consequently relieved of the overhead of resolving channel connections.

What is claimed is:

1. An information access system comprising:

display means for displaying a representation of information content on the system;

differentiation means for differentiating access modes of the information content; and selection means for selecting at least one of the information content for access, according to a corresponding access mode, wherein the access modes include an electronic proximity of the information content to the display means.

2. The information access system of claim 1, wherein the display means comprises a computer, the computer being connected to a network and comprising:

means responsive to a request entered by a user of the computer for displaying links to different types of the information content, the types of the information content being grouped at least according to the electronic proximity of the information content to the computer.

3. The information access system of claim 2 wherein the displayed information types comprise Information Carrousel content, local content, and remote content, in decreasing order of electronic proximity.

4. The information access system of claim 3, wherein each of the types of the information content has associated with it access mode information including physical channel information and the electronic proximity of the type of the information content to the computer.

5. The information access system of claim 2, wherein the computer comprises the display means and selection means.

6. The information access system of claim 2, wherein each instance of information content located on the network contains access information including access mode and channel identification.

7. The information access system of claim 6 wherein the access information comprises tag information in HTML format.

8. The information access system of claim 1, wherein the differentiation means comprises network servers configured to receive information content of different access types, generate access mode information, and transmit the access mode information to the display means.

9. The information access system of claim 8, wherein the network servers are configured to store access information, and to respond, with access information, to expanded HTTP requests from users.

10. The information access system of claim 9 wherein the access information comprises channel map information indicating physical linkage of channels.

11. The information access system of claim 10 wherein the user selects the information content using at least one of the expanded HTTP and channel map information.

12. The information access system of claim 2, wherein the user selects information content to be displayed by the display means according to the electronic proximity of the information content or the type of the information content.

13. A method for accessing information comprising the steps of:

displaying a representation of information content on a system;

differentiating access modes to the information content; and selecting at least one of the information content for access, according to a corresponding access mode, wherein the access modes include an electronic proximity of the information content to an information access device.

14. The method of claim 13, wherein the information access device is a computer connected to a network, and wherein the step of displaying comprises the computer responding to a request entered by a user of the computer for displaying links to different types of the information content, the types of information content being grouped at least according to the electronic proximity of the information content to the computer.

15. The method of claim 14 wherein the step of displaying comprises the step of displaying information types comprising Information Carrousel content, local content, and remote content, in decreasing order of electronic proximity to the user.

16. The method of claim 14, wherein each of the types of the information content has associated with it access mode information including physical channel type and the electronic proximity of the type of the information content to the computer.

17. The method of claim 14, wherein the computer displays the type of information content and access mode information for each of the types of information content, and wherein the selecting step includes the user selecting information content based on the type of information content and the access mode information using the computer.

18. The method of claim 17 wherein each instance of information content located on the network contains access information including access mode and channel identification.

19. The method of claim 18 wherein the access information comprises tag information in HTML format.

20. The method of claim 13, wherein the step of differentiating comprises the step of configuring network servers to receive information from sources of different access types, generating access mode information, and transmitting that information to the information access device.

21. The method of claim 20, wherein the step of configuring comprises the step of configuring the network servers to receive an expanded HTTP request from a user with access information.

22. The method of claim 21 wherein the access information comprises channel map information indicating physical linkage of channels.

23. The method of claim 22, wherein the user selects the information content using at least one of the expanded HTTP and channel map information.

24. The method of claim 14, wherein the user selects information content to be displayed according to the electronic proximity of the information content or the type of the information content.

\* \* \* \* \*